US010114146B2

(12) United States Patent
Tanaka

(10) Patent No.: US 10,114,146 B2
(45) Date of Patent: Oct. 30, 2018

(54) POWDER SENSING DEVICE, IMAGE FORMING APPARATUS, AND TONER COLLECTION CONTAINER

(71) Applicant: KONICA MINOLTA, INC., Chiyoda-ku, Tokyo (JP)

(72) Inventor: Masahiko Tanaka, Toyokawa (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/901,481

(22) Filed: Feb. 21, 2018

(65) Prior Publication Data

US 2018/0284320 A1 Oct. 4, 2018

(30) Foreign Application Priority Data

Mar. 31, 2017 (JP) .................................. 2017-069927

(51) Int. Cl.
G03G 21/12 (2006.01)
G01V 8/12 (2006.01)
G03G 15/095 (2006.01)
G03G 15/00 (2006.01)
F21V 8/00 (2006.01)

(52) U.S. Cl.
CPC ............. *G01V 8/12* (2013.01); *G03G 15/095* (2013.01); *G03G 15/55* (2013.01); *G03G 21/12* (2013.01); *G02B 6/0001* (2013.01); *G03G 2221/0005* (2013.01)

(58) Field of Classification Search
CPC ...... G03G 15/095; G03G 15/55; G03G 21/12; G03G 2221/0005; G01V 8/12; G02B 6/0001
See application file for complete search history.

(56) References Cited

U.S. PATENT DOCUMENTS 8,184,999 B2 * 5/2012 Kyung ............... G03G 15/0862
399/120
2014/0178083 A1 * 6/2014 Lin ......................... G03G 21/12
399/35

FOREIGN PATENT DOCUMENTS

JP 2005352402 A 12/2005
JP 2009186835 A 8/2009

* cited by examiner

Primary Examiner — Hoang Ngo
(74) Attorney, Agent, or Firm — Holtz, Holtz & Volek PC

(57) ABSTRACT

A powder sensing device includes: a housing formed of a transparent member and having powder housed therein; and a light transmission-type sensor capable of sensing that powder is housed in the housing, the light transmission-type sensor including a light emitting unit and a light receiving unit, the light transmission-type sensor being provided such that at least a part of the housing is disposed between the light emitting unit and the light receiving unit. The housing has a light incident surface, a light emission surface and an adjacent surface provided adjacent to the light emission surface. The adjacent surface extends so as to be farther away from an optical axis that connects the light emitting unit and the light receiving unit as the adjacent surface is closer to the light emission surface in a direction of the optical axis that connects the light emitting unit and the light receiving unit.

14 Claims, 12 Drawing Sheets

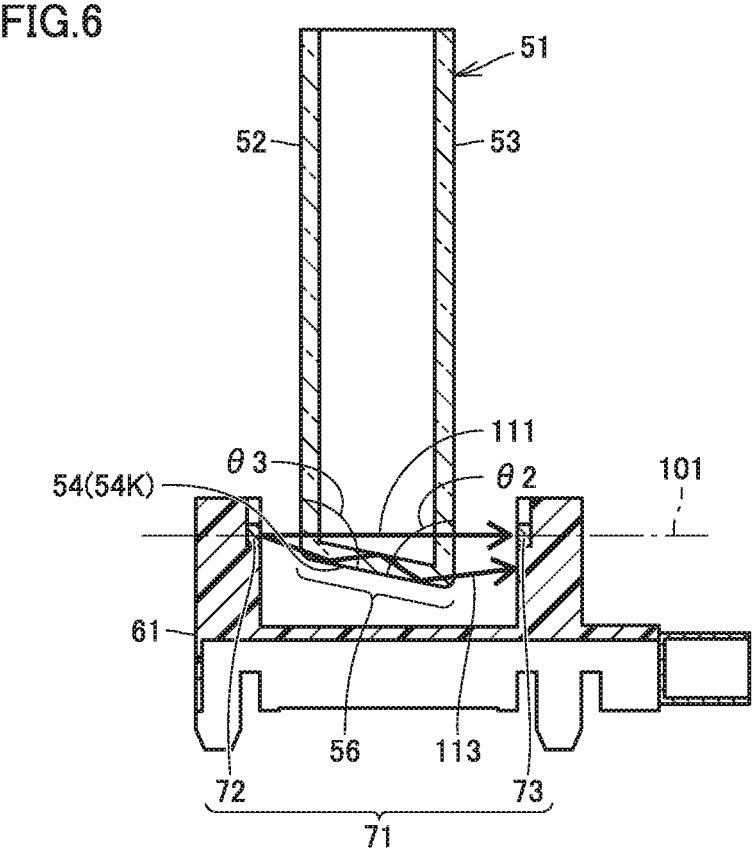

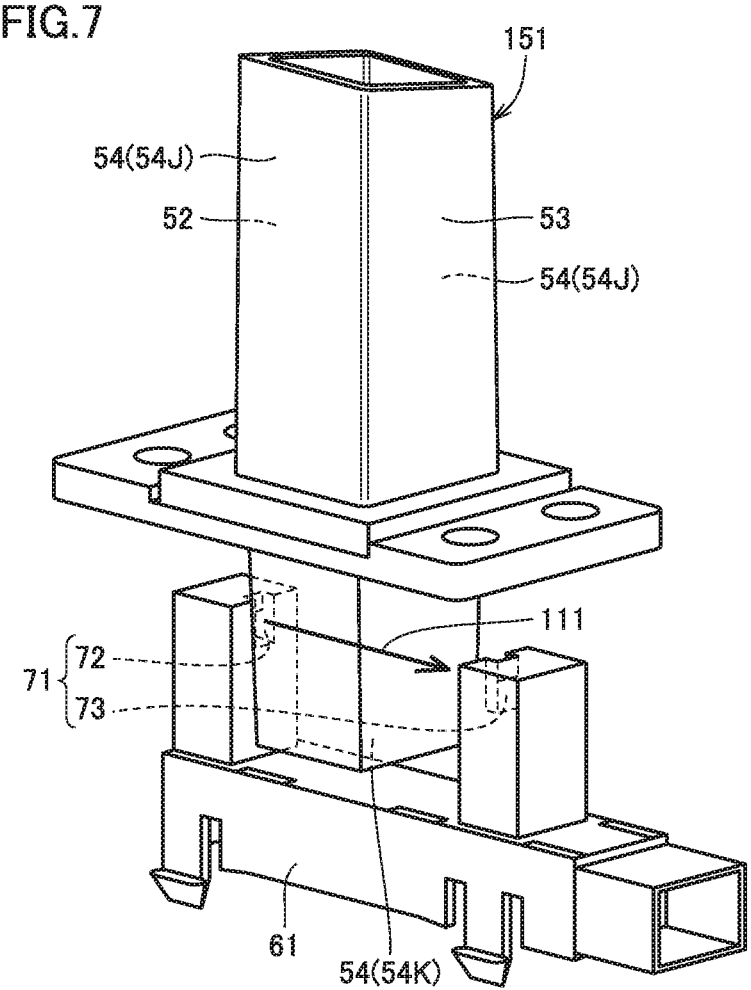

FIG.8A
FIG.8B
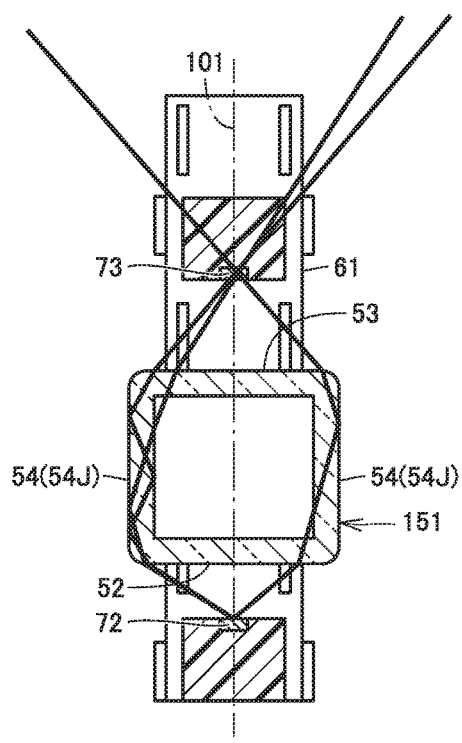
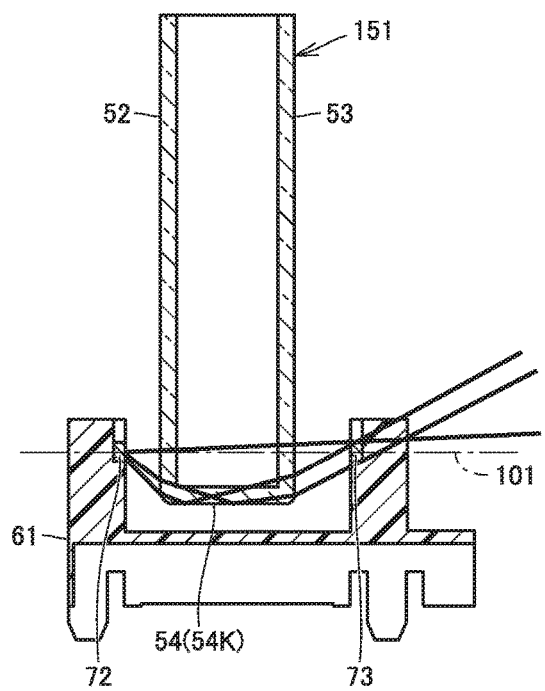

POWDER SENSING DEVICE, IMAGE FORMING APPARATUS, AND TONER COLLECTION CONTAINER

Japanese Patent Application No. 2017-069927 filed on Mar. 31, 2017, including description, claims, drawings, and abstract the entire disclosure is incorporated herein by reference in its entirety.

BACKGROUND

Technological Field

The present invention relates to a powder sensing device, an image forming apparatus, and a toner collection container.

Description of the Related Art

Regarding conventional powder sensing devices, for example. Japanese Laid-Open Patent Publication No. 2005-352402 discloses a powder housing device aiming to highly reliably sense that a collection container becomes full.

The powder housing device disclosed in Japanese Laid-Open Patent Publication No. 2005-352402 is formed of: a collection container having a housing space in which received powder accumulates; a sensing window portion provided in the collection container and forming a sensing space into which the powder accumulated in the housing space is introduced; removing means for periodically scraping out the powder introduced into the sensing space to the housing space; and sensing means for sensing the existence of powder inside the sensing space through the sensing window portion.

Also, Japanese Laid-Open Patent Publication No. 2009-186835 discloses a sensing device aiming to accurately sense the toner amount inside a toner container.

The sensing device disclosed in Japanese Laid-Open Patent Publication No. 2009-186835 is configured to sense the toner amount inside a toner collection container that is attachable to and detachable from an image forming apparatus. The sensing device includes: a light emitting unit and a light receiving unit; and a light shielding member made of an elastic body and configured to suppress leakage of the light emitted from the light emitting unit to the outside of a light path connecting the light emitting unit and the light receiving unit.

SUMMARY

As disclosed in the above-mentioned patent literature, a powder sensing device configured to use a light transmission-type sensor to sense the existence of powder inside a housing is known.

In such a powder sensing device, part of the light emitted from the light emitting unit of the light transmission-type sensor may travel through a thickened portion of the housing formed of a transparent member and reach the light receiving unit of the light transmission type-sensor as stray light. When such stray light occurs, the existence of powder inside the housing may not be able to be appropriately sensed. Also, the means for preventing erroneous sensing needs to be implemented in a simple configuration.

Thus, the present invention has been made to solve the above-described problems, and an object of the present invention is to provide: a powder sensing device capable of appropriately sensing the existence of powder in a housing in a simple configuration; an image forming apparatus including the powder sensing device; and a toner collection container.

To achieve at least one of the abovementioned objects, according to an aspect of the present invention, a powder sensing device reflecting one aspect of the present invention comprises: a housing formed of a transparent member and having powder housed therein; and a light transmission-type sensor capable of sensing that powder is housed in the housing, the light transmission-type sensor including a light emitting unit configured to emit light and a light receiving unit configured to receive light emitted from the light emitting unit, the light transmission-type sensor being provided such that at least a part of the housing is disposed between the light emitting unit and the light receiving unit. The housing has a light incident surface through which light from the light emitting unit enters, a light emission surface from which light toward the light receiving unit is emitted, and an adjacent surface provided adjacent to the light emission surface. The adjacent surface extends so as to be farther away from an optical axis that connects the light emitting unit and the light receiving unit as the adjacent surface is closer to the light emission surface in a direction of the optical axis that connects the light emitting unit and the light receiving unit.

An image forming apparatus according to one aspect of the present invention includes: a toner collection container configured to collect toner that is not used for forming an image on a recording medium; and the powder sensing device described in any of the above for sensing that toner collected in the toner collection container exceeds a prescribed amount.

A toner collection container according to one aspect of the present invention is intended to collect waste toner and installed in an image forming apparatus including a light transmission-type sensor that has a light emitting unit and a light receiving unit. The toner collection container includes: a main body portion to which waste toner is supplied; and a housing having waste toner housed therein, the housing being provided in the main body portion, a part of the housing being disposed outside the main body portion, at least the part of the housing that is disposed outside the main body portion being formed of a transparent member. The housing is provided in the main body portion such that the part of the housing that is disposed outside the main body portion is located between the light emitting unit and the light receiving unit in the light transmission-type sensor. The housing has a light incident surface through which light from the light emitting unit enters, a light emission surface from which light toward the light receiving unit is emitted, and an adjacent surface provided adjacent to the light emission surface. The adjacent surface extends so as to be farther away from an optical axis that connects the light emitting unit and the light receiving unit as the adjacent surface is closer to the light emission surface in a direction of the optical axis that connects the light emitting unit and the light receiving unit.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 6 is a cross-sectional view showing the powder sensing device as seen in the direction indicated by an arrow line VI-VI in FIG. 4.

FIG. 7 is a perspective view showing a powder sensing device in comparative example 1.

FIGS. 8A and 8B are diagrams each showing travelling of light in the powder sensing device in FIG. 7 (a light ray tracing simulation diagram).

DETAILED DESCRIPTION OF EMBODIMENTS

Hereinafter, one or more embodiments of the present invention will be described with reference to the drawings. However, the scope of the invention is not limited to the disclosed embodiments. In the accompanying drawings referred to in the following, the same or corresponding members are designated by the same reference numbers.

First Embodiment

Figure 1:
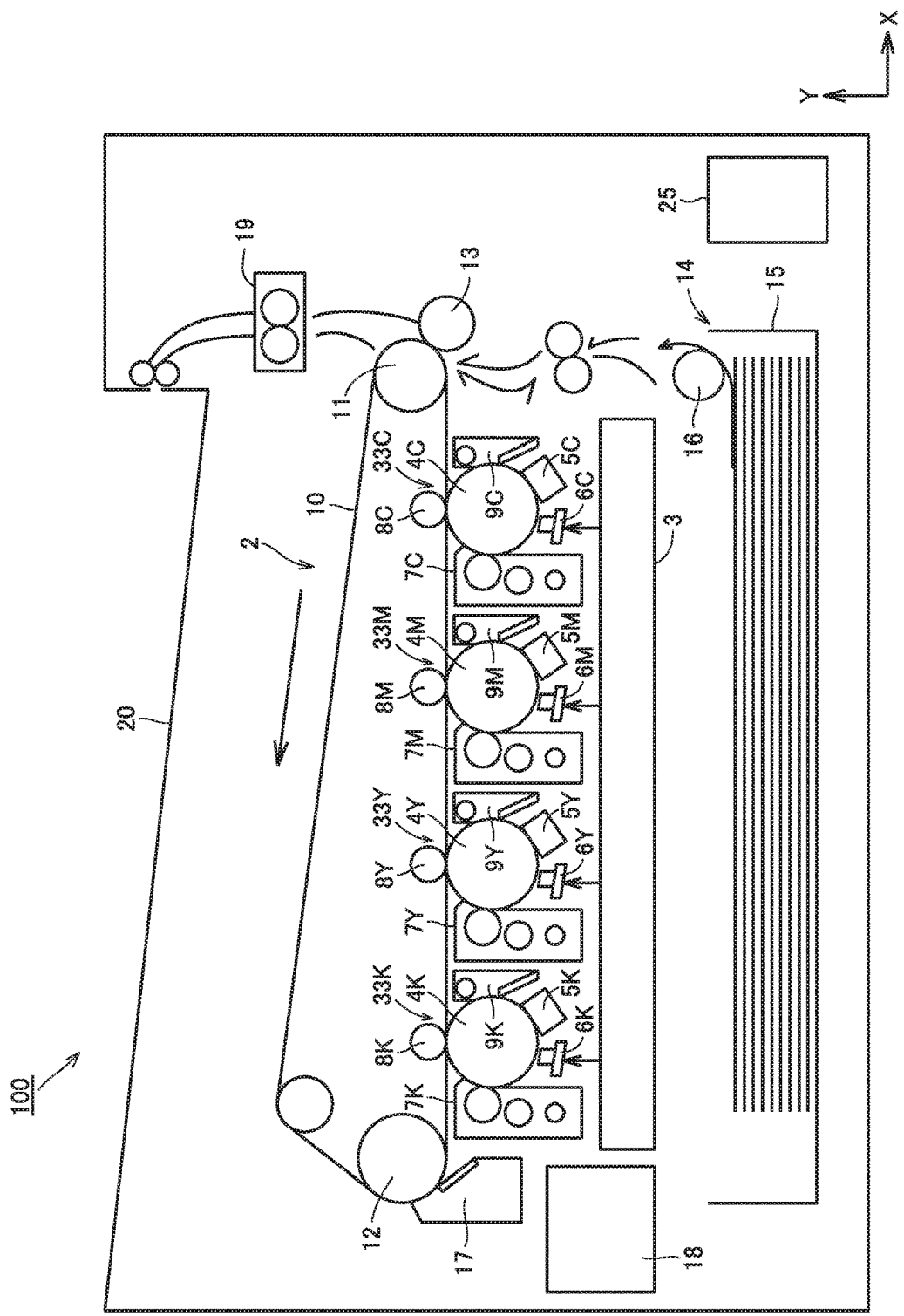
FIG. 1 is a cross-sectional view showing an image forming apparatus equipped with a powder sensing device in the first embodiment of the present invention.

FIG. 1 is a cross-sectional view showing an image forming apparatus equipped with a powder sensing device in the first embodiment of the present invention. Referring to FIG. 1, the entire configuration of an image forming apparatus 100 will be first hereinafter described.

Image forming apparatus 100 is an electrophotographic-type color printer. Image forming apparatus 100 is of a so-called tandem type and configured to combine images in four colors (C: cyan, M: magenta, Y: yellow, K: black).

Image forming apparatus 100 has a function of accepting a print job and forming an image on a recording medium such as a sheet of paper. Image forming apparatus 100 includes a print unit 2, a paper feed unit 14, a control unit 18 formed of a CPU, a paper discharge unit (paper discharge tray) 20, and a toner collection container 25.

Paper feed unit 14 is configured to feed sheets of paper of a plurality of sizes one by one to print unit 2. Paper feed unit 14 includes a paper tray 15 and a paper feed roller 16. A plurality of sheets of paper before printing are stacked on one another in paper tray 15. Although FIG. 1 shows only one paper tray 15, a plurality of paper trays 15 are actually provided corresponding to the number of sizes of the sheets of paper. Paper feed roller 16 takes out the sheets of paper placed in paper tray 15 one by one from this paper tray 15.

Print unit 2 is provided as image forming means for forming an image on a sheet of paper fed from paper feed unit 14. Print unit 2 includes an image forming station 33 (33C. 33M. 33Y. 33K), an exposure control unit 3, a primary transfer roller 8 (8C, 8M, 8Y, 8K), a transfer belt 10, a driving roller 11, a driven roller 12, a secondary transfer roller 13, a cleaning blade 17, and a fixing device 19.

Image forming station 33 (33C, 33M. 33Y. 33K) includes a photoreceptor drum 4 (4C, 4M. 4Y, 4K), a charging unit 5 (5C, 5M, 5Y. 5K), an exposure device 6 (6C, 6M, 6Y. 6K), a developing device 7 (7C. 7M, 7Y. 7K), and a cleaner 9 (9C, 9M. 9Y, 9K).

Photoreceptor drum 4 has a circumferential surface that is charged by charging unit 5. Exposure device 6 applies a laser beam onto the circumferential surface of photoreceptor drum 4 under control of exposure control unit 3. Thereby, an electrostatic latent image is formed on the circumferential surface of photoreceptor drum 4. The developing roller of developing device 7 supplies toner to photoreceptor drum 4 on which this electrostatic latent image is formed. Thereby, a toner image is formed on the circumferential surface of photoreceptor drum 4.

The toner image is primarily transferred by primary transfer roller 8 onto transfer belt 10 stretched to extend between driving roller 11 and driven roller 12. After the toner image is transferred onto transfer belt 10, the remaining toner remaining on the circumferential surface of photoreceptor drum 4 is collected by cleaner 9.

When transfer belt 10 is driven, the primarily transferred toner image is conveyed to secondary transfer roller 13. The toner image is secondarily transferred by secondary transfer roller 13 onto the sheet of paper conveyed from paper feed unit 14. After the loner image is transferred onto the sheet of paper, the remaining toner remaining on transfer belt 10 is collected by cleaning blade 17.

The remaining toner collected by cleaner 9 and cleaning blade 17 is conveyed by a conveyance mechanism (not shown) to toner collection container 25. Toner collection container 25 collects the conveyed remaining toner as waste toner.

The sheet of paper on which the toner image is transferred is conveyed to fixing device 19. Fixing device 19 functions as fixing means for fixing the toner image onto the sheet of paper by performing the process of heating and pressurizing the sheet of paper. Printed sheets of paper are placed in paper discharge tray 20.

Figure 2:
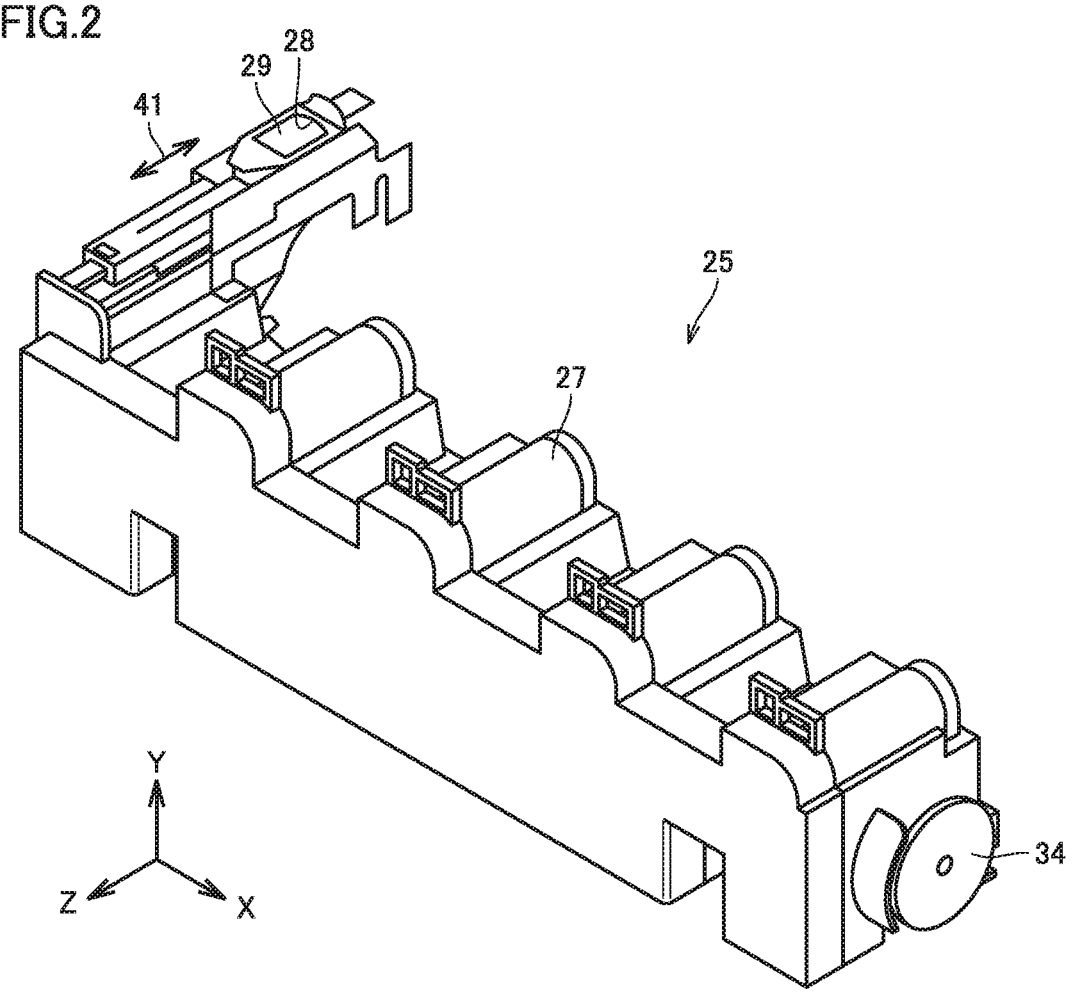
FIG. 2 is a perspective view showing a toner collection container in FIG. 1.
Figure 3:
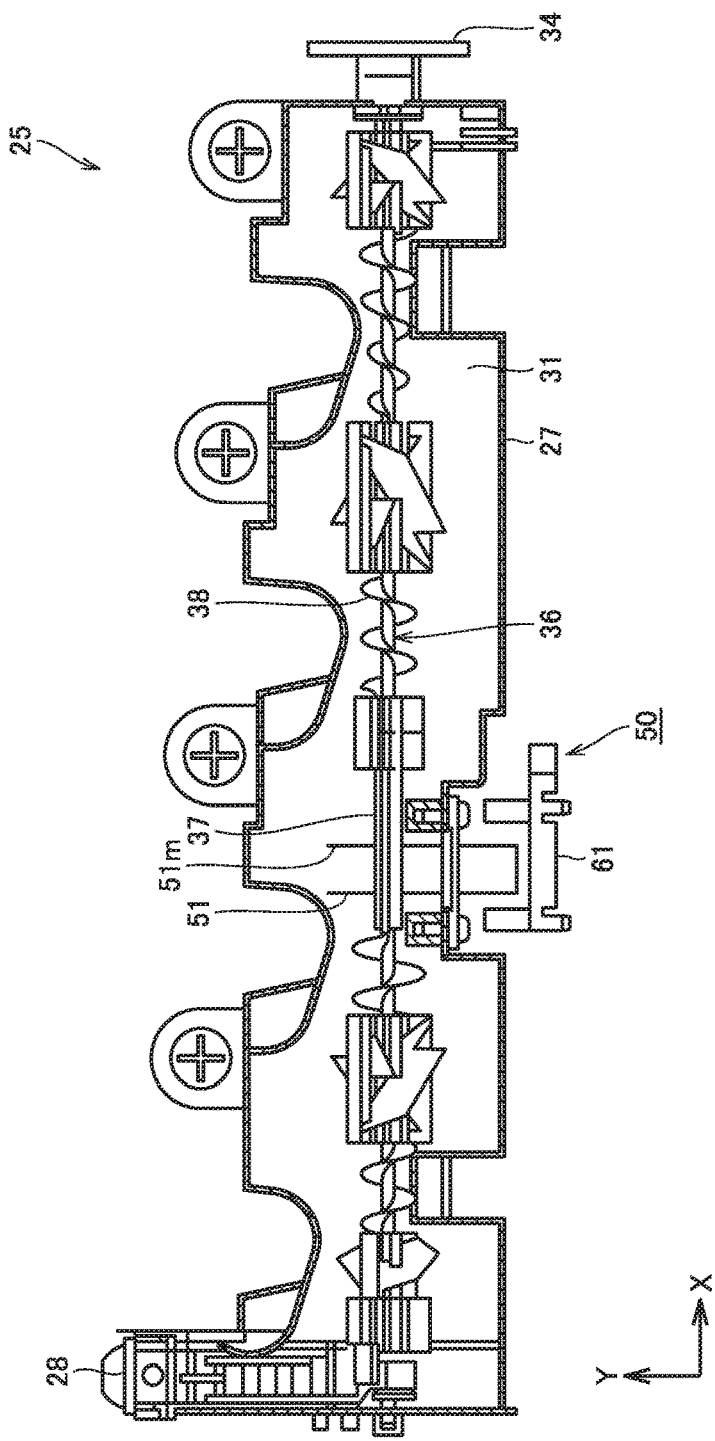
FIG. 3 is a cross-sectional view showing the toner collection container in FIG. 1.

FIG. 2 is a perspective view showing a toner collection container in FIG. 1. FIG. 3 is a cross-sectional view showing the toner collection container in FIG. 1.

FIGS. 1 to 3 each show an X-axis, a Y-axis and a Z-axis that are orthogonal to each other. The X-axis and the Z-axis each extend in parallel with the horizontal direction. The X-axis extends in the width direction (right-left direction) of image forming apparatus 100. The Z-axis extends in the depth direction of image forming apparatus 100. The Y-axis extends in parallel with the vertical direction. FIG. 3 shows a cross section of toner collection container 25 taken along a plane X-Y.

Referring to FIGS. 1 to 3, toner collection container 25 serves as a container for collecting waste toner. Toner collection container 25 is provided so as to be attachable to and detachable from image forming apparatus 100. Toner collection container 25 is entirely formed in a bar shape in which the X-axis direction extends in the longitudinal direction. Although FIG. 1 shows toner collection container 25 so as to be located adjacent to paper tray 15 for convenience of illustration, toner collection container 25 is actually laid so as to extend in the X-axis direction on the machine front surface side of image forming station 33.

Toner collection container 25 includes a main body portion 27, a shutter 29, a gear 34, and a conveyance screw 36.

Main body portion 27 is formed of a housing made of resin. Main body portion 27 is formed of a housing having an elongated shape in which the X-axis direction extends in the longitudinal direction. Main body portion 27 forms an internal space 31. In internal space 31, main body portion 27 houses the remaining toner conveyed from cleaner 9 and cleaning blade 17 as waste toner.

Main body portion 27 is provided with an opening 28 as an input port through which waste loner is introduced. Opening 28 is provided so as to allow communication between internal space 31 and the space on the outside of main body portion 27. Opening 28 is provided at one end on the upper surface of main body portion 27 in the X-axis direction. Shutter 29 is attached to main body portion 27 such that opening 28 can be opened and closed. Shutter 29 is provided so as to be slidable in the direction shown by an arrow 41 in FIG. 2. In the state where toner collection container 25 is installed in image forming apparatus 100, opening 28 is opened by shutter 29. In the state where toner collection container 25 is removed from image forming apparatus 100, opening 28 is closed by shutter 29.

Waste toner is introduced into main body portion 27 through a plurality of input ports including opening 28. Conveyance screw 36 is provided as conveying means for conveying the waste toner in internal space 31. Conveyance screw 36 is formed of components including a shall portion 37 and a blade portion 38. Shaft portion 37 extends in a shaft shape in the X-axis direction in internal space 31. At both ends of shall portion 37 extending in a shaft shape, this shaft portion 37 is rotatably supported by main body portion 27. Blade portion 38 spirally extends in the X-axis direction on the outer circumference of shaft portion 37. Gear 34 is connected to one end of shaft portion 37 in the space on the outside of main body portion 27.

In the state where toner collection container 25 is installed in image forming apparatus 100, the rotational movement is transmitted to gear 34 from the driving means (not shown) such as a motor provided in image forming apparatus 100. In response to the rotational movement from the driving means, conveyance screw 36 rotates about shaft portion 37. Thereby, conveyance screw 36 conveys the waste toner in the X-axis direction so as to prevent the waste toner from being accumulated in an unbalanced manner in internal space 31.

Figure 4:
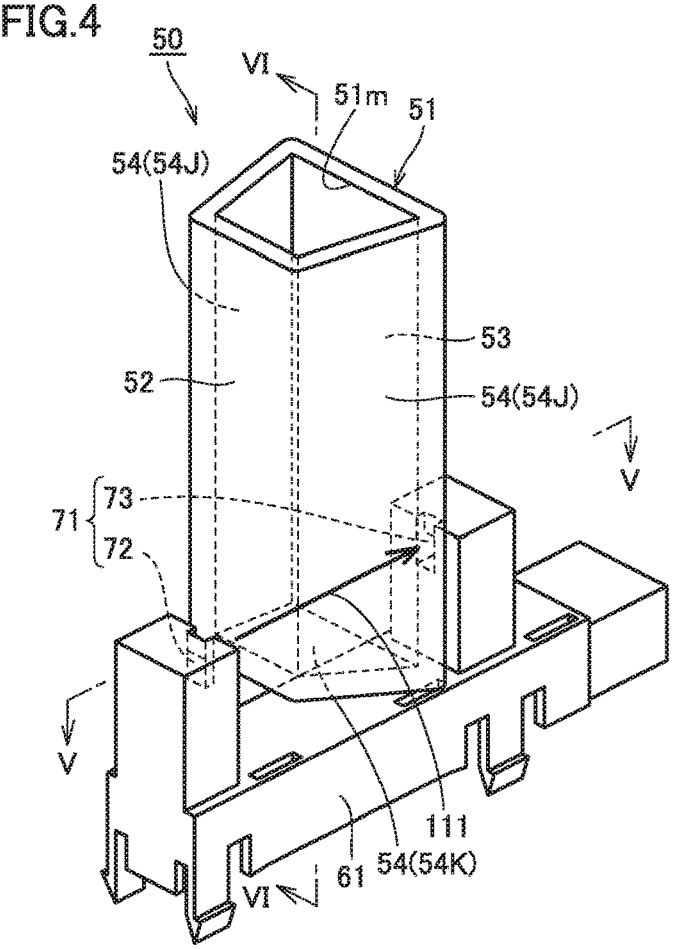
FIG. 4 is a perspective view showing the powder sensing device in the first embodiment of the present invention.

Then, the structure of a powder sensing device 50 in the first embodiment of the present invention will be hereinafter described. FIG. 4 is a perspective view showing the powder sensing device in the first embodiment of the present invention.

Referring to FIGS. 2 to 4, image forming apparatus 100 further includes powder sensing device 50. For the purpose of notifying the user about the maintenance timing (replacement timing) of toner collection container 25, powder sensing device 50 serves to sense that the waste toner collected in internal space 31 has reached a prescribed amount.

Powder sensing device 50 includes a housing 51, a light transmission-type sensor 71, and a sensor support unit 61.

Housing 51 is formed of a transparent member. Housing 51 is formed of a light-transmissive transparent member. Housing 51 is formed in a housing shape having a bottom. Housing 51 has an opening 51m. Opening 51m is opened at the upper end of housing 51.

Housing 51 is attached to toner collection container 25 (more specifically, main body portion 27). Housing 51 is provided such that its bottom portion is located in the space on the outside of main body portion 27 and that opening 51m is located in internal space 31. Opening 51m is located at a prescribed height in internal space 31 in accordance with the amount of waste toner that can be collected in internal space 31.

Light transmission-type sensor 71 includes a light emitting unit 72 and a light receiving unit 73. Light emitting unit 72 and light receiving unit 73 are arranged to face each other. Light emitting unit 72 has a light source and is configured to emit light. Light receiving unit 73 includes a photoelectric conversion element and is configured to receive light emitted from light emitting unit 72 and convert the received light into an electronic signal. Based on the amount of light received in light receiving unit 73, light transmission-type sensor 71 senses the light transmitting/shielding state between light emitting unit 72 and light receiving unit 73.

Sensor support unit 61 is attached to the container receiving portion (not shown) side of image forming apparatus 100 in which toner collection container 25 is installed. Sensor support unit 61 is configured to support light emitting unit 72 and light receiving unit 73.

Housing 51 is disposed between light emitting unit 72 and light receiving unit 73. Housing 51 is disposed on the optical axis of the light (light shown by an arrow 111 in FIG. 4) that connects light emitting unit 72 and light receiving unit 73. The optical axis connecting light emitting unit 72 and light receiving unit 73 intersects housing 51 vertically above the bottom portion of housing 51. The optical axis connecting light emitting unit 72 and light receiving unit 73 intersects housing 51 at the position closer to the bottom portion of housing 51 than to opening 51m in the vertical direction.

When the waste toner collected in internal space 31 does not reach the prescribed amount, the light emitted from light emitting unit 72 transmits through housing 51 formed of a transparent member and reaches light receiving unit 73.

On the other hand, when the waste toner collected in internal space 31 exceeds a certain amount the waste toner conveyed by conveyance screw 36 flows through opening 51m into housing 51. At this time, travelling of the light from light emitting unit 72 toward light receiving unit 73 is blocked by the waste toner flown into housing 51. In other words, the waste toner acts as a light shielding member for the light that travels from light emitting unit 72 toward light receiving unit 73. In response to reduction of the amount of light that enters light receiving unit 73, light transmission-type sensor 71 senses that the waste toner collected in internal space 31 has reached a prescribed amount.

Figure 5:
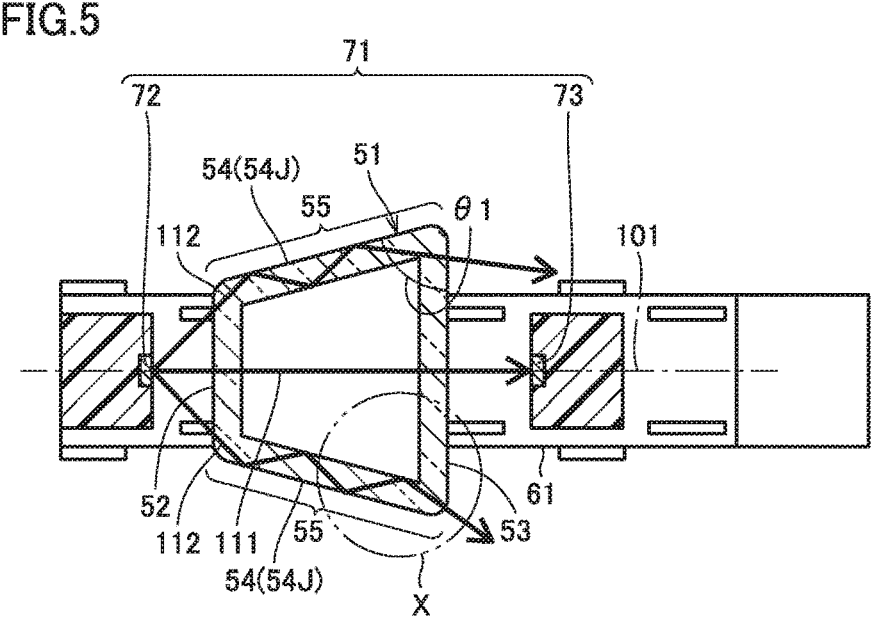
FIG. 5 is a cross-sectional view showing the powder sensing device as seen in the direction indicated by an arrow line V-V in FIG. 4.

FIG. 5 is a cross-sectional view showing the powder sensing device as seen in the direction indicated by an arrow line V-V in FIG. 4. FIG. 6 is a cross-sectional view showing the powder sensing device as seen in the direction indicated by an arrow line VI-VI in FIG. 4. Referring to FIGS. 4 to 6, housing 51 has a light incident surface 52, a light emission surface 53 and an adjacent surface 54. Light incident surface 52, light emission surface 53 and adjacent surface 54 are arranged in the space on the outside of housing 51.

Light incident surface 52 is arranged to face light emitting unit 72. The light emitted from light emitting unit 72 enters light incident surface 52. Light emission surface 53 is arranged to face light receiving unit 73. The light travelling toward light receiving unit 73 is emitted from light emission surface 53.

Light incident surface 52 and light emission surface 53 are orthogonal to the horizontal direction. Light incident surface 52 and light emission surface 53 each are formed of a flat surface. Light incident surface 52 and light emission surface 53 each correspond to an outer surface of housing 51 and are positioned to face each other. Light incident surface 52 and light emission surface 53 are arranged in parallel with each other. Light incident surface 52 and light emission surface 53 are orthogonal to an optical axis 101 that connects light emitting unit 72 and light receiving unit 73. Light incident surface 52 and light emission surface 53 each are a flat surface formed in a rectangular shape. Light incident surface 52 and light emission surface 53 each are a flat surface formed in a rectangular shape in which the vertical direction extends in the longitudinal direction and the horizontal direction extends in the short direction. Light incident surface 52 is shorter in longitudinal (vertical) length and lateral (horizontal) length than light emission surface 53. Light incident surface 52 is smaller in area than light emission surface 53.

Adjacent surface 54 is provided adjacent to light emission surface 53. Adjacent surface 54 intersects light emission surface 53 to form a corner portion. The corner portion formed by adjacent surface 54 and light emission surface 53 may be formed in an edge shape or may be formed in a curved shape. Adjacent surface 54 extends between light incident surface 52 and light emission surface 53.

In the present embodiment, a pair of side surfaces 54J and a bottom surface 54K each are provided as adjacent surface 54.

Side surface 54J is orthogonal to the horizontal direction. Side surface 54I is formed of a flat surface. Paired side surfaces 54J are arranged on the front and rear surfaces of housing 51. Paired side surfaces 54J are arranged not m parallel with each other. Paired side surfaces 54J are arranged on both sides of optical axis 101 that connects light emitting unit 72 and light receiving unit 73. Paired side surfaces 54J are provided symmetrically across optical axis 101 that connects light emitting unit 72 and light receiving unit 73.

Side surface 54J has a connection portion 55. Connection portion 55 is connected to light emission surface 53. In other words, connection portion 55 includes a portion of side surface 54J that intersects light emission surface 53. Connection portion 55 extends so as to be farther away from optical axis 101 that connects light emitting unit 72 and light receiving unit 73 as connection portion 55 is closer to light emission surface 53 in the axis direction of optical axis 101 that connects light emitting unit 72 and light receiving unit 73. In other words, the distance between connection portion 55 and optical axis 101 that connects light emitting unit 72 and light receiving unit 73 is increased toward light emission surface 53 in the axis direction of optical axis 101 that connects light emitting unit 72 and light receiving unit 73. In the present embodiment, side surface 54J entirely corresponds to connection portion 55.

Side surface 54J intersects light emission surface 53 at an angle θ1 less than 90°. When housing 51 is cut along the horizontal plane including optical axis 101 that connects light emitting unit 72 and light receiving unit 73, a cut surface is obtained in a trapezoidal shape, in which light incident surface 52 forms an upper side, light emission surface 53 forms a lower side that is in parallel with the upper side and longer than the upper side, and a pair of side surfaces 54J form oblique sides extending between the upper side and the lower side.

Bottom surface 54K is located vertically below the optical axis. Bottom surface 54K is formed of a flat surface. Bottom surface 54K is disposed on the opposite side of the opening plane of opening 51m across optical axis 101 that connects light emitting unit 72 and light receiving unit 73.

Bottom surface 54K has a connection portion 56. Connection portion 56 is connected to light emission surface 53. In other words, connection portion 56 includes a portion of bottom surface 54K that intersects light emission surface 53. Connection portion 56 extends so as to be farther away from optical axis 101 that connects light emitting unit 72 and light receiving unit 73 as connection portion 56 is closer to light emission surface 53 in the axis direction of optical axis 101 that connects light emitting unit 72 and light receiving unit 73. In other words, the distance between connection portion 56 and optical axis 101 that connects light emitting unit 72 and light receiving unit 73 is increased toward light emission surface 53 in the axis direction of optical axis 101 that connects light emitting unit 72 and light receiving unit 73. In the present embodiment, bottom surface 54K entirely corresponds to connection portion 56.

Bottom surface 54K intersects light emission surface 53 at an angle θ2 less than 90°. When housing 51 is cut along the vertical plane including optical axis 101 that connects light emitting unit 72 and light receiving unit 73, a cut surface is obtained in which light incident surface 52 and bottom surface 54K intersect with each other at an angle θ3 larger than 90°, and light emission surface 53 and bottom surface 54K intersect with each other at angle θ2 less than 90°.

Then, the functions and effects achieved by powder sensing device 50 in the present embodiment will be hereinafter described together with the problems in comparative examples.

FIG. 7 is a perspective view showing a powder sensing device in comparative example 1. FIGS. 8A and 8B are diagrams each showing travelling of light in the powder sensing device in FIG. 7 (a light ray tracing simulation diagram).

Referring to FIGS. 7, 8A and 8B, the powder sensing device in the present comparative example includes a housing 151 in place of housing 51 shown in FIGS. 4 to 6. In housing 151, a pair of side surfaces 54J extend between light incident surface 52 and light emission surface 53 in parallel with optical axis 101 that connects light emitting unit 72 and light receiving unit 73. The pair of side surfaces 54J intersects light emission surface 53 at a right angle. Furthermore, bottom surface 54K extends between light incident surface 52 and light emission surface 53 in parallel with optical axis 101 that connects light emitting unit 72 and light receiving unit 73. Bottom surface 54K intersects light emission surface 53 at a right angle.

As shown in FIGS. 8A and 8B, par of the light emitted from light emitting unit 72 enters a thickened portion of housing 151 located in adjacent surface 54 (a pair of side surfaces 54J and bottom surface 54K). After passing through the thickened portion of housing 151 while repeating total reflection and the like, the light reaches light receiving unit 73 as stray light. In this case, even if waste toner exists inside housing 151, there is a possibility that the powder sensing device may erroneously sense that waste toner does not exist inside housing 151.

Figure 9:
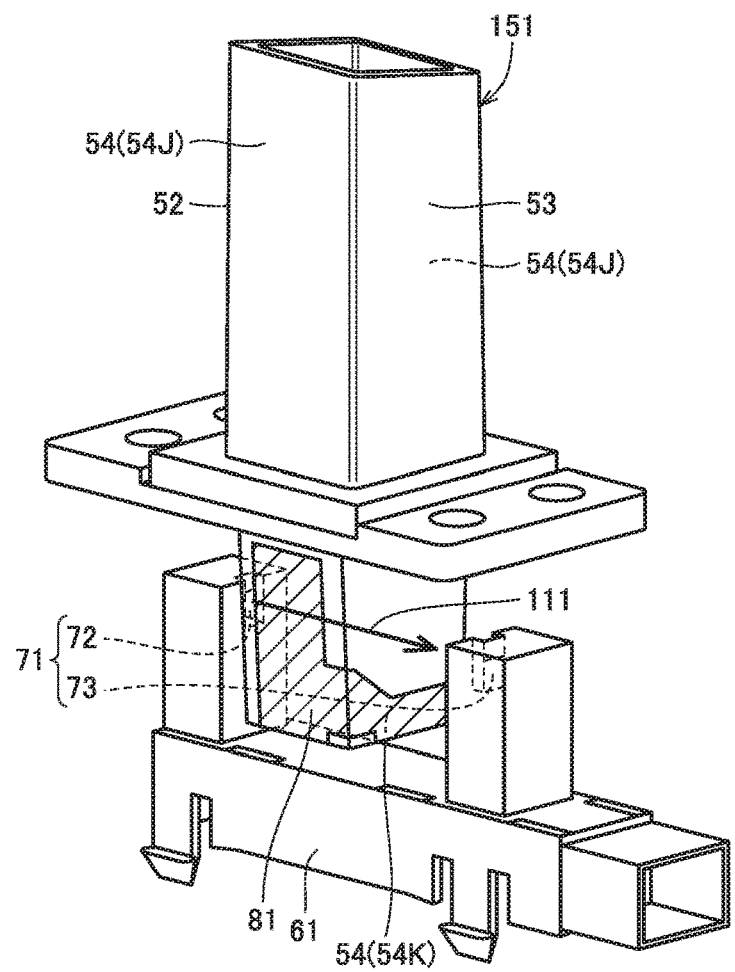
FIG. 9 is a perspective view showing a powder sensing device in comparative example 2.

FIG. 9 is a perspective view showing a powder sensing device in comparative example 2. Referring to FIG. 9, the powder sensing device in the present comparative example includes a light shielding member 81 in addition to housing 151 in comparative example 1.

Light shielding member 81 is formed or a member having a light shielding effect, and in the present comparative example, formed using Mylar (registered trademark) having a light shielding effect. Light shielding member 81 is affixed to the surface of housing 151 but not affixed to the light path of the light travelling from light emitting unit 72 toward light receiving unit 73 as shown by an arrow 111.

As shown in the present comparative example, it is conceivable to provide light shielding member 81 as countermeasures against erroneous sensing caused by stray light. However, depending on the positional accuracy of light shielding member 81, the above-mentioned countermeasures cannot sufficiently prevent the stray light from reaching light receiving unit 73. For example, when toner collection container 25 is attached to image forming apparatus 100 with poor accuracy, deviation occurs in the mutual positional relation between housing 151 and each of light emitting unit 72 and light receiving unit 73, with the result that light shielding member 81 cannot be positioned with sufficient accuracy. Furthermore, by providing light shielding member 81, there is a possibility that the number of components of the powder sensing device may increase, or the assembly performance may deteriorate.

In contrast, referring to FIGS. 4 to 6, in powder sensing device 50 in the present embodiment, a pair of side surfaces 54J each has connection portion 55 that extends so as to be farther away from optical axis 101 that connects light emitting unit 72 and light receiving unit 73 as connection portion 55 is closer to light emission surface 53 in the axis direction of optical axis 101 that connects light emitting unit 72 and light receiving unit 73. Also, bottom surface 54K has connection portion 56 that extends so as to be farther away from optical axis 101 that connects light emitting unit 72 and light receiving unit 73 as connection portion 56 is closer to light emission surface 53 in the axis direction of optical axis 101 that connects light emitting unit 72 and light receiving unit 73.

By such a configuration, the light transmitted through the thickened portion of housing 51 located in the pair of side surfaces 54J travels through connection portion 55 so as to be farther away from optical axis 101 that connects light emitting unit 72 and light receiving unit 73 as shown by an arrow 112 in FIG. 5. Thus, this light is less likely to reach light receiving unit 73. Also, the light transmitted through the thickened portion of housing 51 located in bottom surface 54K travels thorough connection portion 56 so as to be farther away from optical axis 101 that connects light emitting unit 72 and light receiving unit 73 as shown by an arrow 113 in FIG. 6. Thus, this light is less likely to reach light receiving unit 73. Thereby, the existence of powder in housing 51 can be appropriately sensed without being influenced by stray light.

Furthermore, the mechanism for preventing such erroneous sensing is implemented by the shape of housing 51. Accordingly, the existence of powder inside housing 51 can be sensed with stability without considering the influences caused by displacement and peeling of the light shielding member. Also, increase in number of components of powder sensing device 50 can be prevented, and deterioration of the assembly performance can be prevented.

In the present embodiment, an explanation has been given with regard to the configuration in which light incident surface 52 and light emission surface 53 are orthogonal to optical axis 101 that connects light emitting unit 72 and light receiving unit 73, but without limitation thereto, at least one of light incident surface 52 and light emission surface 53 may obliquely intersect optical axis 101 that connects light emitting unit 72 and light receiving unit 73.

Figure 10:
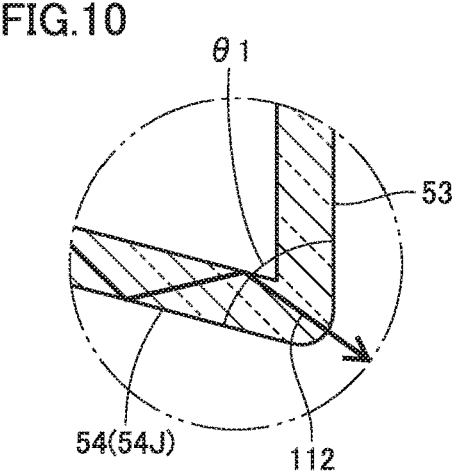
FIG. 10 is an enlarged cross-sectional view of an area surrounded by an alternate long and two short dashed line X in FIG. 5.

FIG. 10 is an enlarged cross-sectional view of an area surrounded by an alternate long and two short dashed line X in FIG. 5. Referring to FIG. 10, for preventing stray light from reaching light receiving unit 73, it is more advantageous that the light transmitted through the thickened portion of housing 51 located in side surface 54J is emitted to the outside without propagating this light through the thickened portion of housing 51 located in light emission surface 53. From the viewpoint as described above, it is preferable that side surface 54J intersects light emission surface 53 at an angle less than 90°. Similarly, it is preferable that bottom surface 54K intersects light emission surface 53 at an angle less than 90°.

The following is a summarized explanation about the structure of powder sensing device 50 and image forming apparatus 100 in the first embodiment of the present invention as described above. Specifically, powder sensing device 50 in the present embodiment includes: a housing 51 formed of a transparent member and having powder housed therein; and a light transmission-type sensor 71 capable of sensing that powder is housed inside housing 51, in which light transmission-type sensor 71 has a light emitting unit 72 configured to emit light and a light receiving unit 73 configured to receive the light emitted from light emitting unit 72, and light transmission-type sensor 71 is disposed such that at least a part of housing 51 is disposed between light emitting unit 72 and light receiving unit 73. Housing 51 includes a light incident surface 52 through which the light from light emitting unit 72 enters, a light emission surface 53 from which the light toward light receiving unit 73 is emitted, and an adjacent surface 54 (a pair of side surfaces 54J and a bottom surface 54K) provided adjacent to light emission surface 53. Adjacent surface 54 (a pair of side surfaces 54J and bottom surface 54K) extends so as to be farther away from an optical axis 101 that connects light emitting unit 72 and light receiving unit 73 as adjacent surface 54 (a pair of side surfaces 54J and bottom surface 54K) is closer to light emission surface 53 in the axis direction of optical axis 101 that connects light emitting unit 72 and light receiving unit 73.

An image forming apparatus 100 in the present embodiment includes: a toner collection container 25 configured to collect toner that is not used for forming an image on a sheet of paper as a recording medium; and a powder sensing device 50 for sensing that the toner collected in toner collection container 25 exceeds a prescribed amount.

According to powder sensing device 50 and image forming apparatus 100 in the first embodiment of the present invention that are configured in this way, the existence of powder in housing 51 can be appropriately sensed in a simple configuration. Also, the maintenance timing (replacement timing) of toner collection container 25 can be appropriately recognized.

In addition, the powder sensing device in the present invention is not limited to sensing of waste toner, but also applicable to sensing of powder such as sugar, salt and grain, and sensing of powder such as glass raw materials and plastic raw materials, for example.

Second Embodiment

In the present embodiment, various modifications of powder sensing device 50 described in the first embodiment will be first described.

Figure 11:
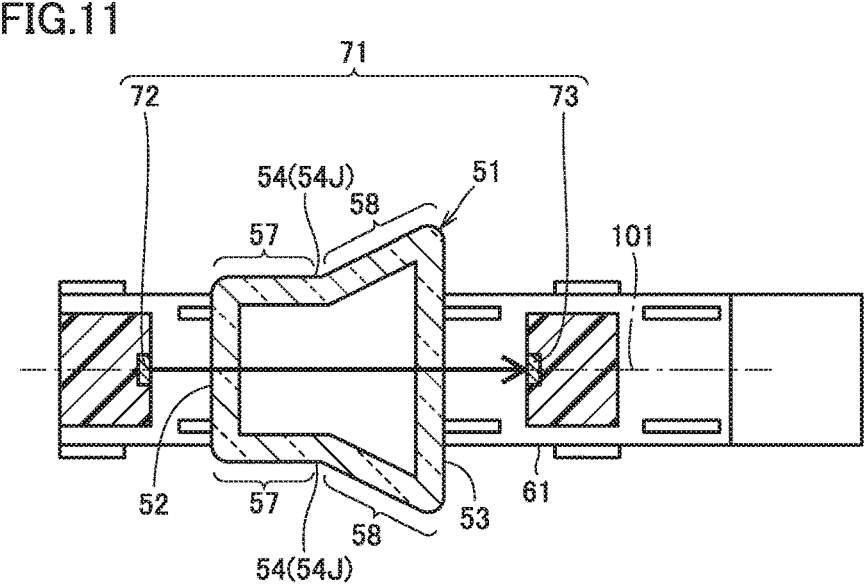
FIG. 11 is a cross-sectional view showing the first modification of the powder sensing device.

FIG. 11 is a cross-sectional view showing the first modification of the powder sensing device FIG. 11 corresponds to FIG. 5 in the first embodiment.

Referring to FIG. 11, in the present modification, side surface 54J includes a parallel portion 57 and an inclined portion 58. Parallel portion 57 is disposed on the side close to light incident surface 52 in the axis direction of optical axis 101 that connects light emitting unit 72 and light receiving unit 73. Inclined portion 58 is disposed on the side close to light emission surface 53 in the axis direction of optical axis 101 that connects light emitting unit 72 and light receiving unit 73. Parallel portion 57 extends in parallel with optical axis 101 that connects light emitting unit 72 and light receiving unit 73. Inclined portion 58 is connected to light emission surface 53. Inclined portion 58 extends so as to be farther away from optical axis 101 that connects light emitting unit 72 and light receiving unit 73 as inclined portion 58 is closer to light emission surface 53 in the axis direction of optical axis 101 that connects light emitting unit 72 and light receiving unit 73.

In the present modification, inclined portion 58 corresponds to the connection portion in the present invention. Also in this configuration, the light transmitted through the thickened portion of housing 51 located in the pair of side surfaces 54J travels through inclined portion 58 so as to be farther away from optical axis 101 that connects light emitting unit 72 and light receiving unit 73. Accordingly, the same effect as that in the first embodiment is achieved.

Figure 12:
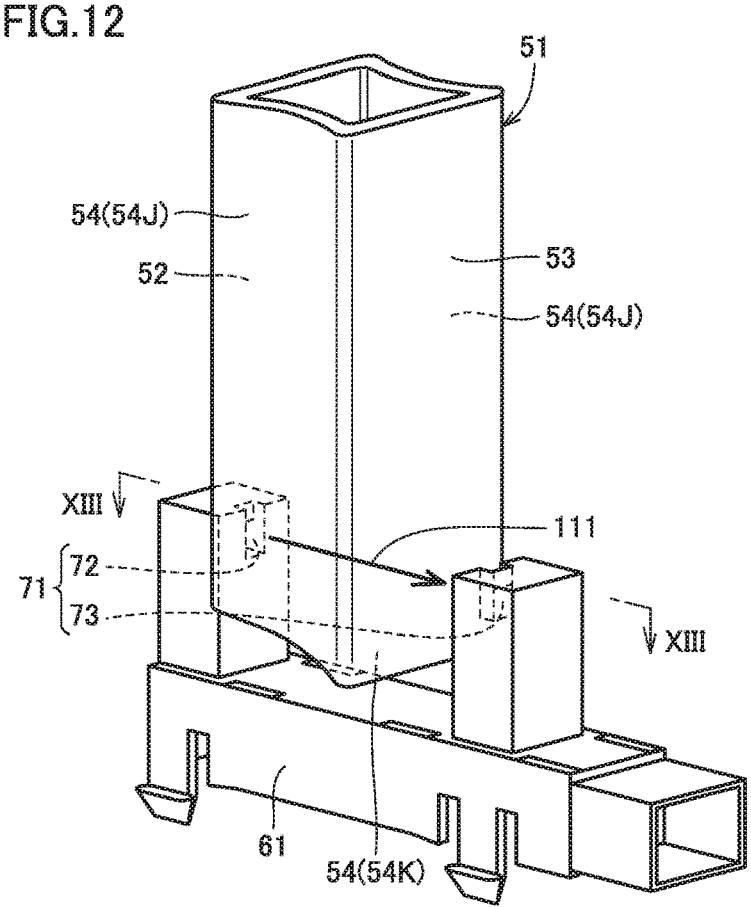
FIG. 12 is a perspective view showing the second modification of the powder sensing device.
Figure 13:
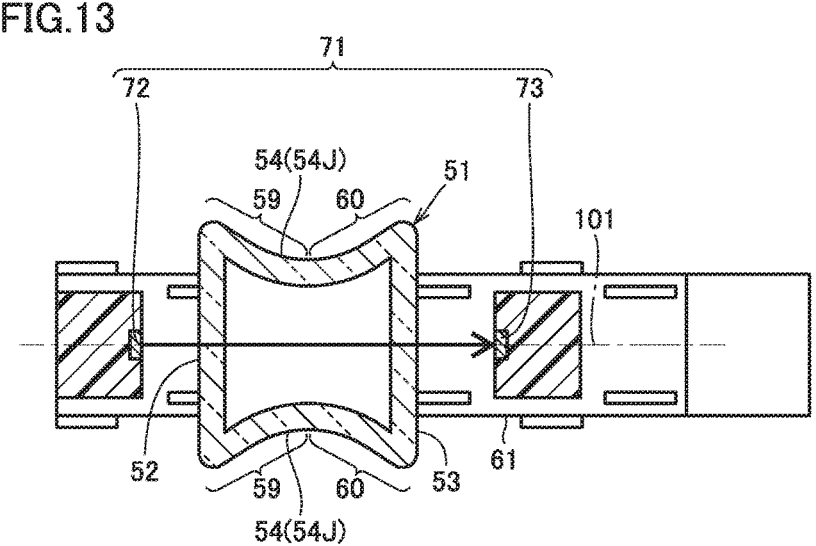
FIG. 13 is a cross-sectional view showing the powder sensing device as seen in the direction indicated by an arrow line XIII-XIII in FIG. 12.

FIG. 12 is a perspective view showing the second modification of the powder sensing device. FIG. 13 is a cross-sectional view showing the powder sensing device as seen in the direction indicated by an arrow line XIII-XIII in FIG. 12.

Referring to FIGS. 12 and 13, in the present modification, side surface 54J is entirely formed of a curved surface that is recessed inwardly to housing 51. Side surface 54J has a first curved portion 59 and a second curved portion 60. First curved portion 59 is disposed on the side close to light incident surface 52 in the axis direction of optical axis 101 that connects light emitting unit 72 and light receiving unit 73. Second curved portion 60 is disposed on the side close to light emission surface 53 in the axis direction of optical axis 101 that connects light emitting unit 72 and light receiving unit 73. The boundary between first curved portion 59 and second curved portion 60 corresponds to a concave-shaped bottom portion included in side surface 54J.

First curved portion 59 extends so as to be closer to optical axis 101 that connects light emitting unit 72 and light receiving unit 73 as first curved portion 59 is farther away from light emission surface 52 in the axis direction of optical axis 101 that connects light emitting unit 72 and light receiving unit 73. Second curved portion 60 is connected to light emission surface 53. Second curved portion 60 extends so as to be farther away from optical axis 101 that connects light emitting unit 72 and light receiving unit 73 as second curved portion 60 is closer to light emission surface 53 in the axis direction of optical axis 101 that connects light emitting unit 72 and light receiving unit 73.

In the present modification, second curved portion 60 corresponds to the connection portion in the present invention. Also in the configuration as described above, the light transmitted through the thickened portion of housing 51 located in the pair of side surfaces 54J travels through second curved portion 60 so as to be farther away from optical axis 101 that connects light emitting unit 72 and light receiving unit 73. Accordingly, the same effect as that in the first embodiment is achieved.

Figure 14A:
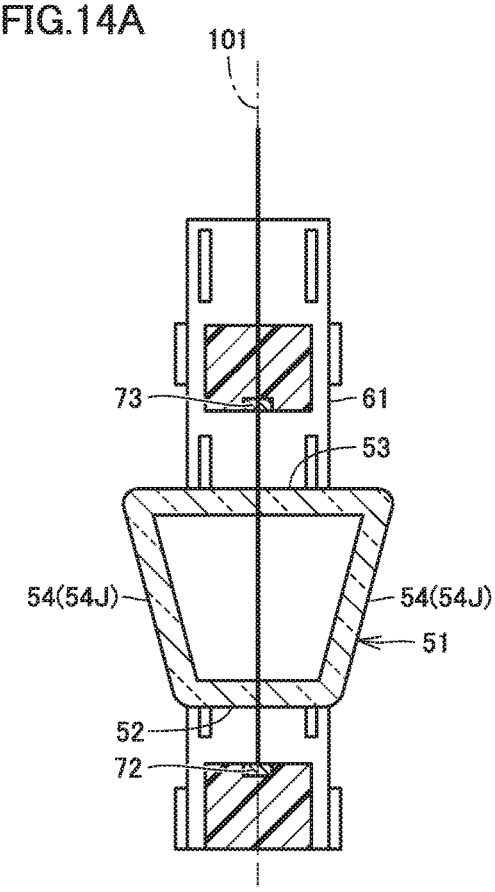
FIGS. 14A and 14B are diagrams each showing a path of stray light produced on the bottom surface side in the powder sensing device in FIG. 4 (a light ray tracing simulation diagram).
Figure 14B:
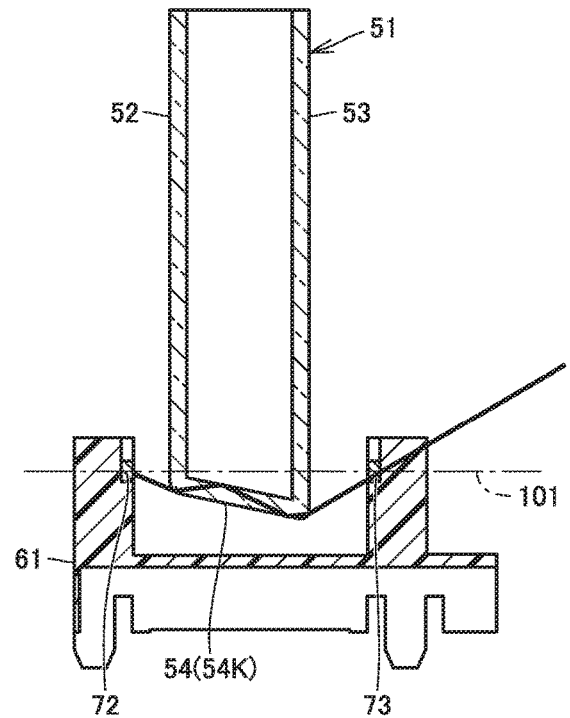
Figure 15:
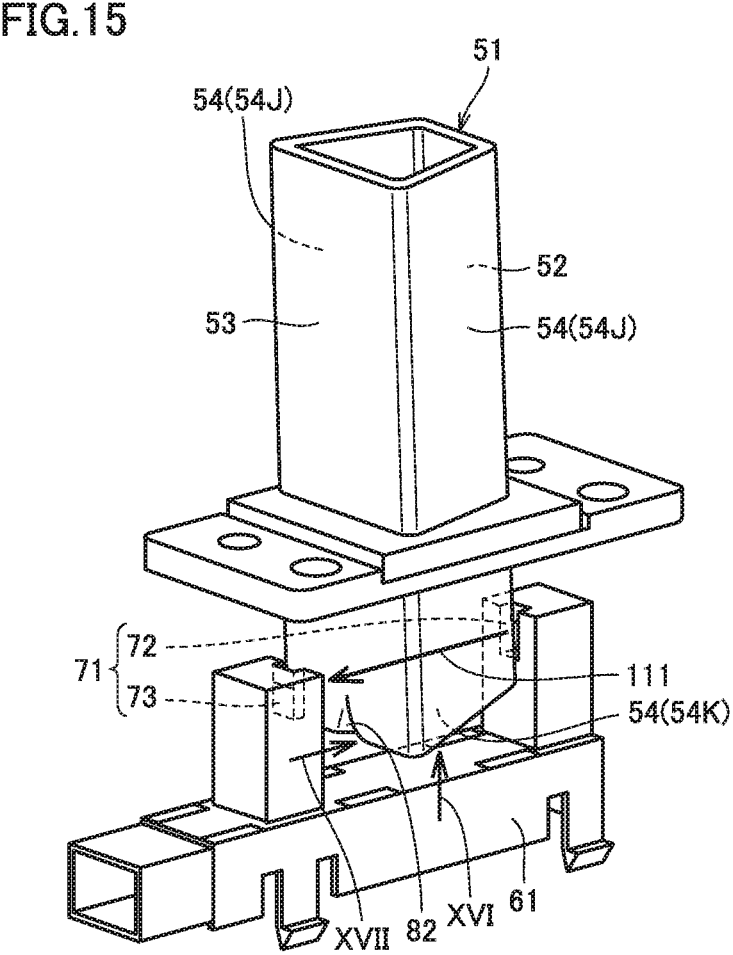
FIG. 15 is a perspective view showing the third modification of the powder sensing device.
Figure 16:
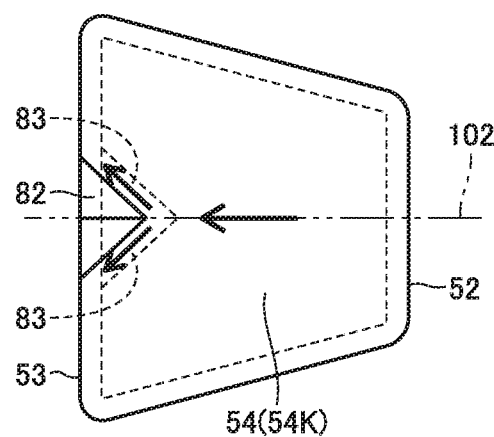
FIG. 16 is a diagram showing a housing as seen in the direction indicated by an arrow line XVI in FIG. 15.
Figure 17:
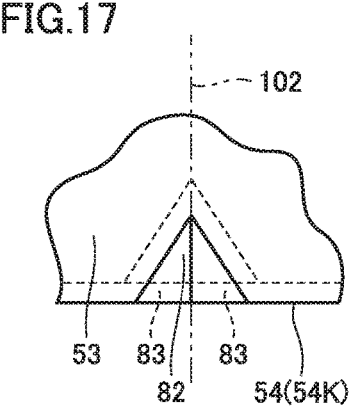
FIG. 17 is a diagram showing the housing as seen in the direction indicated by an arrow line XVII in FIG. 15.

FIGS. 14A and 14B are diagrams each showing a path of stray light produced on the bottom surface side in the powder sensing device in FIG. 4 (a light ray tracing simulation diagram). FIG. 15 is a perspective view showing the third modification of the powder sensing device. FIG. 16 is a diagram showing a housing as seen in the direction indicated by an arrow line XVI in FIG. 15. FIG. 17 is a diagram showing the housing as seen in the direction indicated by an arrow line XVII in FIG. 15.

Referring to the light ray tracing simulation diagram shown in each of FIGS. 14A and 14B, it turns out that the stray light travelling through the pair of side surfaces 54J almost does not exist, but the stray light travelling through bottom surface 54K only slightly remains directly below optical axis 101 that connects light emitting unit 72 and light receiving unit 73.

Referring to FIGS. 15 to 17, in the present modification, bottom surface 54K has a concave portion 82. Concave portion 82 has a concave shape that is recessed from bottom surface 54K inwardly to housing 51. Concave portion 82 is provided at a corner portion formed of bottom surface 54K and light emission surface 53. When bottom surface 54K is seen in front view, concave portion 82 forms a triangular-shaped opening plane on the flat surface of bottom surface 54K (see FIG. 16). When light emission surface 53 is seen in front view, concave portion 82 forms a triangular-shaped opening plane on the flat surface of light emission surface 53 (see FIG. 17).

Thereby, bottom surface 54K is provided with a rib-shaped portion 83 as a light guide portion. Rib-shaped portion 83 extends from a vertical plane 102 including optical axis 101 that connects light emitting unit 72 and light receiving unit 73 in a rib shape in the direction away from vertical plane 102 as rib-shaped portion 83 is closer to light emission surface 53 in the axis direction of optical axis 101 that connects light emitting unit 72 and light receiving unit 73.

Rib-shaped portion 83 is provided in bottom surface 54K as a light guide portion configured to guide light (stray light shown in FIGS. 14A and 14B) travelling along the cut surface of housing 51 taken along vertical plane 102 so as to travel in the direction away from the cut surface of housing 51 taken along vertical plane 102 as the light travels closer to light emission surface 53 in the axis direction of optical axis 101 that connects light emitting unit 72 and light receiving unit 73. Thereby, the light transmitted through the thickened portion of housing 51 located in bottom surface 54K can be more effectively suppressed from travelling toward light receiving unit 73.

In addition, the rib-shaped portion functioning as a light guide portion can be configured by a triangular-shaped protruding portion that protrudes from bottom surface 54K to the outside of housing 51. Furthermore, the rib-shaped portion functioning as a light guide portion is not limited to the corner portion formed of bottom surface 54K and light emission surface 53, but may be disposed at a position away from light emission surface 53 in the axis direction of optical axis 101 that connects light emitting unit 72 and light receiving unit 73.

According to the powder sensing device in the second embodiment of the present invention configured in this way, the effect described in the first embodiment can be similarly achieved.

The following is an explanation about the light ray tracing simulation in which the stray light ratios m comparative example 1 (FIGS. 7, 8A and 8B), comparative example 2 (FIG. 9), example 1 (the first embodiment in FIGS. 4 to 6), and example 2 (the third modification in FIGS. 15 to 17) are compared.

The stray light ratio means the rate of arrival of light at light receiving unit 73 obtained when a waste toner in housing 51 (151) becomes full on the condition that the rate of arrival of light at light receiving unit 73 with no existence of a waste toner in housing 51 (151) is defined as 100%.

Figure 18:
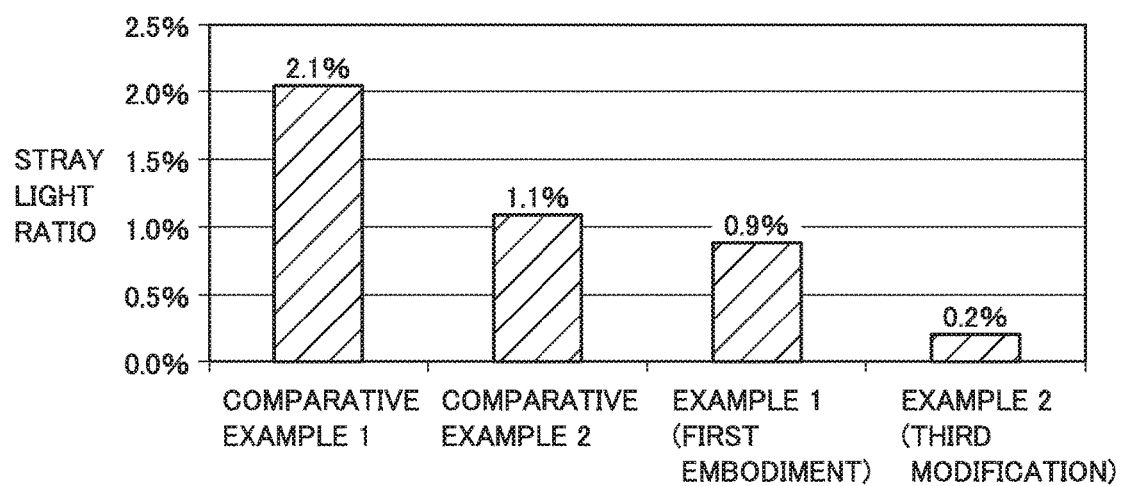
FIG. 18 is a graph showing stray light ratios in comparative example 1, comparative example 2, example 1, and example 2.

FIG. 18 is a graph showing stray light ratios in comparative example 1, comparative example 2, example 1, and example 2.

Referring to FIG. 18, as a result of the light ray tracing simulation, the stray light ratio in comparative example 1 in each of FIGS. 7, 8A and 8B shows the largest value. In comparative example 2 shown in FIG. 9, by providing light shielding member 81, the stray light ratio is reduced by about half as compared with that in comparative example 1.

In example 1 in FIGS. 4 to 6, the stray light ratio lower than that in comparative example 2 can be obtained without having to use a light shielding member. Furthermore, in example 2 in FIGS. 15 to 17 in which countermeasures are taken against the stray light travelling through bottom surface 54K, the lowest stray light ratio can be achieved.

The powder sensing device according to another aspect of the present embodiment includes: a housing formed of a transparent member and having powder housed therein; and a light transmission-type sensor capable of sensing the existence of powder in the housing, the light transmission-type sensor having a light emitting unit configured to emit light and a light receiving unit configured to receive the light emitted from the light emitting unit the light transmission-type sensor being provided such that the housing is disposed between the light emitting unit and the light receiving unit. The housing has a light incident surface through which light from the light emitting unit enters, a light emission surface from which light toward the light receiving unit is emitted, and an adjacent surface provided adjacent to the light emission surface. The adjacent surface includes a connection portion extending so as to be farther away from an optical axis that connects the light emitting unit and the light receiving unit as the connection portion is closer to the light emission surface in an axis direction of the optical axis that connects the light emitting unit and the light receiving unit. The connection portion is connected to the light emission surface.

According to the powder sensing device configured in this way, the light transmitted through the thickened portion of the housing located in the adjacent surface travels through the connection portion so as to be farther away from the optical axis that connects the light emitting unit and the light receiving unit. Thus, travelling of the light toward the light receiving unit can be suppressed. Thereby, the existence of powder in the housing can be appropriately sensed. Furthermore, since the mechanism configured to prevent such erroneous sensing is implemented by the shape of the housing itself, the powder sensing device can be formed in a simple configuration.

Further preferably, the adjacent surface intersects the light emission surface at an angle less than 90°.

According to the powder sensing device configured m this way, the light transmitted through the thickened portion of the housing located in the adjacent surface is less likely to propagate through the thickened portion of the housing located in the light emission surface. Thereby, the light transmitted through the thickened portion of the housing can be more effectively suppressed from travelling toward the light receiving unit.

Further preferably, the adjacent surface is further provided adjacent to the light incident surface. The light incident surface is smaller in area than the light emission surface.

According to the powder sensing device configured in this way, the adjacent surface can be more readily provided with a connection portion that extends so as to be farther away from the optical axis that connects the light emitting unit and the light receiving unit as the connection portion is closer to the light emission surface in the axis direction of the optical axis that connects the light emitting unit and the light receiving unit.

Further preferably, the housing has a pair of side surfaces each as an adjacent surface. When the housing is cut along a flat plane including the optical axis that connects the light emitting unit and the light receiving unit, a cut surface exists in a trapezoidal shape in which the light incident surface forms an upper side, the light emission surface forms a lower side that is in parallel with the upper side and longer than the upper side, and a pair of side surfaces form oblique sides extending between the upper side and the lower side.

According to the powder sensing device configured in this way, the light transmitted through the thickened portion of the housing located in the pair of side surfaces can be suppressed from travelling toward the light receiving unit.

Further preferably, the housing has a bottom surface as an adjacent surface. When the housing is cut along a vertical plane including the optical axis that connects the light emitting unit and the light receiving unit, a cut surface is obtained in which the light incident surface and the bottom surface intersect with each other at an angle greater than 90°, and the light emission surface and the bottom surface intersect with each other at an angle less than 90°.

According to the powder sensing device configured in this way, the light transmitted through the thickened portion of the housing located in the bottom surface can be suppressed from travelling toward the light receiving unit.

Further preferably, the bottom surface is provided with a light guide portion configured to guide light travelling along the cut surface so as to travel in a direction away from the cut surface as the light travels closer to the light emission surface in the axis direction of the optical axis that connects the light emitting unit and the light receiving unit.

According to the powder sensing device configured in this way, the light transmitted through the thickened portion of the housing located in the bottom surface can be more effectively suppressed from travelling toward the light receiving unit.

An image forming apparatus according to another aspect of the present embodiment includes: a toner collection container configured to collect toner that is not used for forming an image on a recording medium; and the powder sensing device described in any of the above and configured to sense that toner collected in the toner collection container exceeds a prescribed amount.

According to the image forming apparatus configured in this way, the maintenance timing of the toner collection container can be appropriately recognized.

The present invention is applicable to a powder sensing device formed using a light transmission-type sensor.

Although embodiments of the present invention have been described and illustrated in detail, it is clearly understood that the same is by way of illustration and example only and not limitation, the scope of the present invention should be interpreted by terms of the appended claims.

What is claimed is:

1. A powder sensing device comprising:
   a housing formed of a transparent member and having powder housed therein; and
   a light transmission-type sensor capable of sensing that powder is housed in the housing, the light transmission-type sensor including a light emitting unit configured to emit light and a light receiving unit configured to receive light emitted from the light emitting unit, the light transmission-type sensor being provided such that at least a part of the housing is disposed between the light emitting unit and the light receiving unit,
   the housing having
      a light incident surface through which light from the light emitting unit enters,
      a light emission surface from which light toward the light receiving unit is emitted, and
      an adjacent surface provided adjacent to the light emission surface,
   the adjacent surface extending so as to be farther away from an optical axis that connects the light emitting unit and the light receiving unit as the adjacent surface is closer to the light emission surface in a direction of the optical axis that connects the light emitting unit and the light receiving unit.

2. The powder sensing device according to claim 1, wherein the adjacent surface intersects the light emission surface at an angle less than 90°.

3. The powder sensing device according to claim 1, wherein
   the adjacent surface is provided adjacent to the light incident surface, and
   the light incident surface is smaller in area than the light emission surface.

4. The powder sensing device according to claim 1, wherein
   the housing has a pair of side surfaces each as the adjacent surface, and
   when the housing is cut along a flat plane including the optical axis, a cut surface exists in a trapezoidal shape in which the light incident surface forms an upper side, the light emission surface forms a lower side that is in parallel with the upper side and longer than the upper side, and the pair of side surfaces form oblique sides extending between the upper side and the lower side.

5. The powder sensing device according to claim 1, wherein
   the housing has a bottom surface as the adjacent surface,
   the bottom surface corresponds to an outer surface of the housing, and
   when the housing is cut along a vertical plane including the optical axis, a cut surface is obtained in which the fight incident surface and the bottom surface intersect with each other at an angle greater than 90°, and the light emission surface and the bottom surface intersect with each other at an angle less than 90°.

6. The powder sensing device according to claim 5, wherein
   the bottom surface is provided with a light guide portion configured to guide light travelling along the cut surface so as to travel in a direction away from the optical axis that connects the light emitting unit and the light receiving unit as the light travels closer to the light emission surface in the direction of the optical axis.

7. An image forming apparatus comprising:
   a toner collection container configured to collect toner that is not used for forming an image on a recording medium; and
   the powder sensing device according to claim 1 for sensing that toner collected in the toner collection container exceeds a prescribed amount.

8. A toner collection container for collecting waste toner, the toner collection container being installed in an image forming apparatus including a light transmission-type sensor that has a light emitting unit and a light receiving unit, the toner collection container comprising:
   a main body portion to which waste toner is supplied; and
   a housing having waste toner housed therein, the housing being provided in the main body portion, a part of the housing being disposed outside the main body portion, at least the part of the housing that is disposed outside the main body portion being formed of a transparent member,
   the housing being provided in the main body portion such that the part of the housing that is disposed outside the main body portion is located between the light emitting unit and the light receiving unit in the light transmission-type sensor,
   the housing having
      a light incident surface through which light from the light emitting unit enters,
      a light emission surface from which light toward the light receiving unit is emitted, and
      an adjacent surface provided adjacent to the light emission surface,
   the adjacent surface extending so as to be farther away from an optical axis that connects the light emitting unit and the light receiving unit as the adjacent surface is closer to the light emission surface in a direction of the optical axis that connects the light emitting unit and the light receiving unit.

9. The toner collection container according to claim 8, wherein
   the housing has an opening and a bottom portion, and
   the opening is provided inside the main body portion and the bottom portion is disposed outside the main body portion.

10. The toner collection container according to claim 8, wherein the adjacent surface intersects the light emission surface at an angle less than 90°.

11. The toner collection container according to claim 8, wherein
   the adjacent surface is provided adjacent to the light incident surface, and
   the light incident surface is smaller in area than the light emission surface.

12. The toner collection container according to claim 8, wherein
   the housing has a pair of side surfaces each as the adjacent surface, and
   when the housing is cut along a flat plane including the optical axis, a cut surface exists in a trapezoidal shape in which the light incident surface forms an upper side, the light emission surface forms a lower side that is in parallel with the upper side and longer than the upper side, and the pair of side surfaces form oblique sides extending between the upper side and the lower side.

13. The toner collection container according to claim 8, wherein the housing has a bottom surface as the adjacent surface, the bottom surface corresponds to an outer surface of the housing, and when the housing is cut along a vertical plane including the optical axis, a cut surface is obtained in which the light incident surface and the bottom surface intersect with each other at an angle greater than 90°, and the light emission surface and the bottom surface intersect with each other at an angle less than 90°.

14. The toner collection container according to claim 13, wherein the bottom surface is provided with a light guide portion configured to guide light travelling along the cut surface so as to travel in a direction away from the optical axis that connects the light emitting unit and the light receiving unit as the light travels closer to the light emission surface in the direction of the optical axis.

* * * * *